Aug. 29, 1933.  L. E. LA BRIE  1,924,610
BRAKE

Filed Nov. 5, 1930

INVENTOR
LUDGER E. LA BRIE
BY M. W. McConkey
ATTORNEY

Patented Aug. 29, 1933

1,924,610

UNITED STATES PATENT OFFICE 1,924,610

BRAKE

Ludger E. La Brie, South Bend, Ind., assignor to Bendix Brake Company, South Bend, Ind., a corporation of Illinois Application November 5, 1930. Serial No. 493,528

5 Claims. (Cl. 188—78)

This invention relates to brakes and is illustrated as embodied in an internal expanding brake for an automobile. An object of the invention is to provide applying means for a brake, preferably applying means of a type suitable for use with shiftable-anchorage friction means, and which can readily be operated by a Bowden type of control extending generally perpendicular to the plane of the backing plate at its brake end.

In one desirable arrangement, the brake is operated by a bell crank lever fulcrumed on the brake backing plate for movement in a plane approximately perpendicular to the plane of the backing plate and which has at one end a floating applying lever or the like which engages the shoes or their equivalents, and which is connected to the Bowden control or its equivalent at its other end. Various features of novelty relate to the mounting of the bell crank lever and to its connection with the applying lever and to the Bowden control and to other novel and desirable structural features which will be apparent from the following description of one illustrative embodiment shown in the accompanying drawing, in which:

Figure 1:
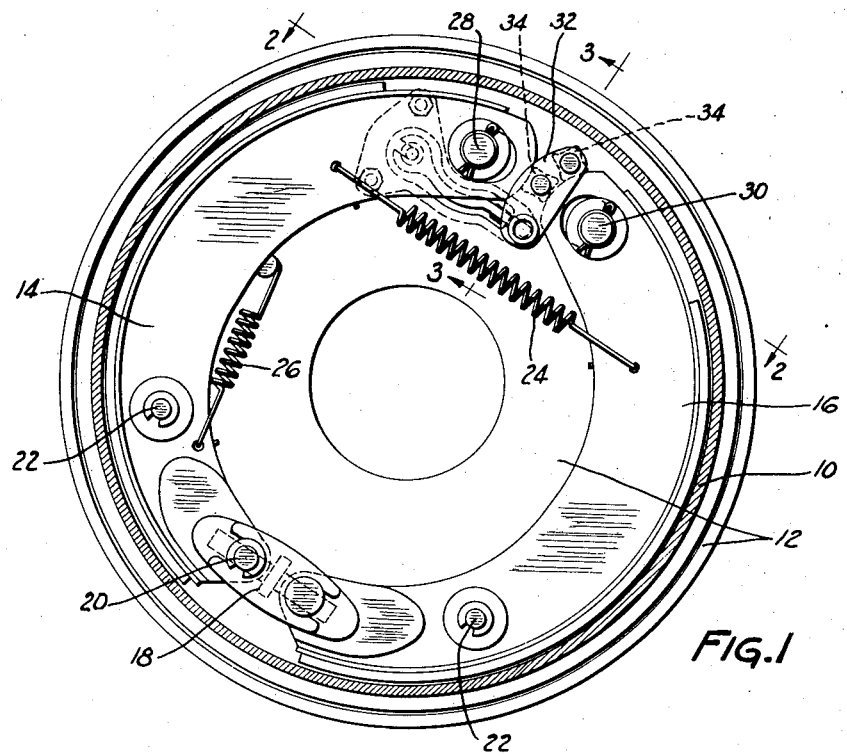
Figure 1 is a vertical section through the brake just inside the head of the brake drum and showing the brake shoes in side elevation.
Figure 2:
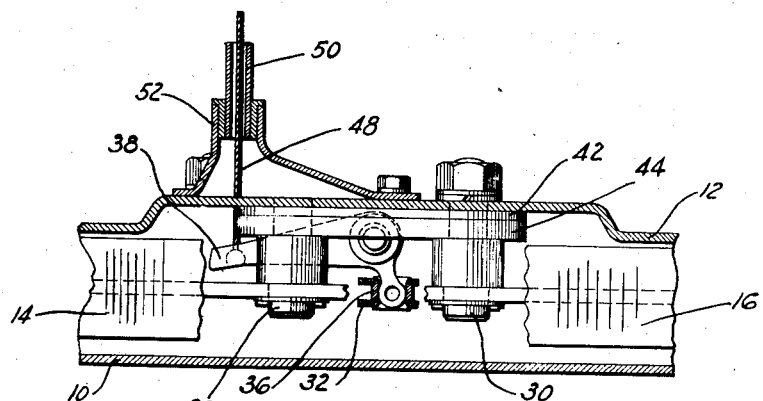
Figure 2 is a partial section on the line 2—2 of Figure 1 and showing the mounting of the bell crank lever.
Figure 3:
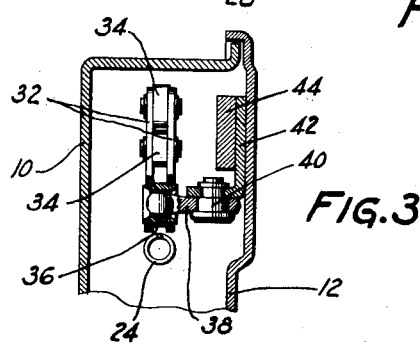
Figure 3 is a partial section on the line 3—3 of Figure 1 and showing the mounting of the floating brake applying lever on the bell crank lever.

The illustrated brake includes a rotatable drum 10 at the open side of which is arranged a suitable support such as a backing plate 12 and within which is arranged the friction means of the brake. The friction means is preferably of the shiftable-anchorage type and may include a pair of shoes 14 and 16 connected by means such as a floating adjustable joint 18 connected to the shoes by pivots 20. The shoes may have steady rests or the like 22 of any desired form and are shown provided with a main return spring 24 tensioned between the shoes and an auxiliary return spring 26 tensioned between the shoe 14 and the backing plate. When the drum is turning clockwise, the shoe 14 anchors on a fixed anchor post 28 carried by the backing plate, while when the drum is turning counter-clockwise shoe 16 anchors on a similar anchor post 30 also carried by the backing plate.

According to the present invention, the brake is applied by prying its ends apart by means such as a novel floating brake applying lever which may be built up of side plates or stampings 32 between which are pivoted thrust blocks 34 engaging the shoes and which at its lower end is provided with a socket member 36 pivotally seated on the rounded end of a novel bell crank lever 38. Bell crank lever 38 is fulcrumed on a pivot 40 having its axis generally paralleling the brake backing plate and mounted on the bracket 42 secured, together with a reinforcing plate 44, to the backing plate. I consider it most convenient to secure the bracket 42 and the reinforcing plate 44 to the backing plate by means of the anchors 28 and 30.

The end of the lever 38 upon which the floating applying lever is pivoted extends generally in a direction perpendicular to the backing plate, whereas the opposite end of the bell crank lever, which may be made at least twice as long, extends at a slight angle to the backing plate and is connected to the end of a cable or the like 48, the brake end of which extends through a flexible Bowden conduit 50 in a direction substantially perpendicular to the plane of the backing plate and which cable goes through the backing plate and is connected to the longer end of the lever 38 inside of the brake. For convenience, I mount a stamped fitting 52 on the backing plate, to which the end of the flexible Bowden conduit 50 may be connected.

While one illustrative embodiment of the invention has been described in detail, it is not my intention to limit the scope of that particular embodiment or otherwise than by the terms of the appended claims. The present application is intended to be junior to application No. 368,600, filed June 5, 1929, and application No. 306,367, filed September 17, 1928.

I claim:

1. A brake comprising a backing plate carrying shiftable-anchorage friction means, in combination with a bell crank lever fulcrumed on the backing plate and movable in a plane approximately at right angles thereto, a floating applying lever pivoted on one arm of the bell crank lever and arranged between the ends of the friction means and operable to pry said ends apart to apply the brake, a flexible conduit having its end extending in a direction approximately perpendicular to the plane of the backing plate and secured to the backing plate, and a flexible tension element extending through the conduit and through the backing plate and connected to the other arm of the bell crank lever.

2. A brake comprising a backing plate carrying shiftable-anchorage friction means, in combination with a bell crank lever inside and fulcrumed on the backing plate and movable in a plane approximately at right angles thereto, a floating applying lever pivoted on one arm of the bell crank lever and arranged between the ends of the friction means and operable to pry said ends apart to apply the brake, and operating means passing through the backing plate and connected to the bell crank lever.

3. A brake backing plate having mounted thereon a bracket carrying a pivot with its axis approximately paralleling the plane of the backing plate, a bell crank lever mounted on said pivot for movement in a plane approximately perpendicular to the plane of the backing plate and having one arm extending approximately perpendicular to the backing plate and having the other arm extending along the backing plate at a slight angle thereto, a floating brake applying lever pivotally mounted on the first arm of the bell crank lever, and operating means extending through the backing plate and connected to the second arm of the bell crank lever.

4. A brake backing plate having mounted thereon a bracket carrying a pivot with its axis approximately paralleling the plane of the backing plate, a bell crank lever mounted on said pivot for movement in a plane approximately perpendicular to the plane of the backing plate and having one arm extending approximately perpendicular to the backing plate and having the other arm extending along the backing plate at a slight angle thereto, a floating brake applying lever pivotally mounted on the first arm of the bell crank lever, and a Bowden control including a conduit secured to the backing plate and a tension element passing through the backing plate and connected to the other arm of the bell crank lever.

5. A brake backing plate having mounted thereon a bracket carrying a pivot with its axis approximately paralleling the plane of the backing plate, a bell crank lever mounted on said pivot for movement in a plane approximately perpendicular to the plane of the backing plate and having one arm extending approximately perpendicular to the backing plate and having the other arm extending along the backing plate at a slight angle thereto, a floating brake applying lever pivotally mounted on the first arm of the bell crank lever, and a Bowden control including a part secured to the backing plate and a tension element connected to the other arm of the bell crank lever.

LUDGER E. LA BRIE.